US012680379B2

(12) United States Patent
Chou

(10) Patent No.: US 12,680,379 B2
(45) Date of Patent: Jul. 14, 2026

(54) TOUCH-CONTROLLED WINDOW COVERING SYSTEM

(71) Applicant: Tser Wen Chou, Yorba Linda, CA (US)

(72) Inventor: Tser Wen Chou, Yorba Linda, CA (US)

( * ) Notice: Subject to any disclaimer, the term of this patent is extended or adjusted under 35 U.S.C. 154(b) by 361 days.

(21) Appl. No.: 18/233,613

(22) Filed: Aug. 14, 2023

(65) Prior Publication Data

US 2024/0309700 A1 Sep. 19, 2024

(30) Foreign Application Priority Data

Mar. 13, 2023 (TW) ................................ 112202206
Apr. 10, 2023 (TW) ................................ 112203217

(51) Int. Cl.
*E06B 9/42* (2006.01)
*E06B 9/60* (2006.01)

(52) U.S. Cl.
CPC . *E06B 9/42* (2013.01); *E06B 9/60* (2013.01)

(58) Field of Classification Search
CPC ..... E06B 9/42; E06B 9/44; E06B 9/60; E06B 9/322; E06B 9/323; E06B 9/388; E06B 9/50; E06B 9/78; E06B 9/90; E06B 2009/3222; E06B 2009/785
See application file for complete search history.

(56) References Cited

U.S. PATENT DOCUMENTS 1,783,002 A * 11/1930 Simpson .................. E06B 9/90 160/298
5,437,324 A * 8/1995 Sternquist ................ E06B 9/44 160/307
5,542,464 A * 8/1996 Shiina ...................... E06B 9/56 160/321
6,467,714 B1 * 10/2002 Rasmussen .............. E06B 9/44 242/381
7,246,648 B2 * 7/2007 Minder .................... E06B 9/90 160/8
12,209,457 B2 * 1/2025 Wang ........................ E06B 9/88
12,416,202 B2 * 9/2025 Lu ............................ E06B 9/42
12,435,563 B2 * 10/2025 Schmick .................. E06B 9/50
2011/0297334 A1 * 12/2011 Bohlen .................... E06B 9/42 160/310
2013/0037225 A1 * 2/2013 Huang ...................... E06B 9/60 160/313

(Continued)

*Primary Examiner* — Beth A Stephan
(74) *Attorney, Agent, or Firm* — J.H. Lin Patent Law P.C.; John H. Lin

(57) ABSTRACT

An apparatus for cordlessly retracting and releasing a roller blind or a roller shade is provided. The apparatus allows the user to effectuate repositioning the shade or blind at a desired position, by lightly tapping or touching or maneuvering the shade or blind. The apparatus includes a screen and a roller tubing that rotates to release or retract the screen. The screen has a bottom rail attached to its bottom. The apparatus includes a lifting spring that is pre-torqued for rotating the roller tubing to lift the screen. The apparatus also includes a rotation damper for providing a friction to dampen or stop a rotation of the roller tubing. The lifting spring is pre-compressed to provide sufficient torque and energy to retract the screen. The bottom rail is configured to match the torque produced by the lifting spring to achieve an equilibrium when the user is not touching the screen.

17 Claims, 16 Drawing Sheets

(56) References Cited

U.S. PATENT DOCUMENTS

| | | | | |
|---|---|---|---|---|
| 2013/0153161 | A1* | 6/2013 | Haarer | E06B 9/60<br>160/293.1 |
| 2014/0216666 | A1* | 8/2014 | Smith | E06B 9/90<br>160/84.04 |
| 2016/0010390 | A1* | 1/2016 | Smith | E06B 9/32<br>160/315 |
| 2019/0178030 | A1* | 6/2019 | Brown, II | E06B 9/40 |
| 2019/0257146 | A1* | 8/2019 | Norton | E06B 9/90 |
| 2020/0157882 | A1* | 5/2020 | Chen | E06B 9/42 |
| 2020/0157883 | A1* | 5/2020 | Ng | E06B 9/60 |
| 2021/0032931 | A1* | 2/2021 | Jang | E06B 9/72 |
| 2022/0341258 | A1* | 10/2022 | Yu | E06B 9/50 |
| 2024/0141725 | A1* | 5/2024 | Chou | E06B 9/42 |
| 2024/0328250 | A1* | 10/2024 | Schmick | E06B 9/72 |
| 2025/0290368 | A1* | 9/2025 | Hestbæk | E06B 9/72 |

* cited by examiner

TOUCH-CONTROLLED WINDOW COVERING SYSTEM

CROSS REFERENCE TO RELATED APPLICATIONS

This patent application claims the benefit and priority of Taiwanese Patent Application No. 112202206, filed on Mar. 13, 2023, and Taiwanese Patent Application No. 112203217, filed on Apr. 10, 2023. Contents of Taiwanese Patent Applications No. 112202206 and No. 112203217 are incorporated herein by reference.

BACKGROUND

Technical Field

The present disclosure generally relates to mechanisms of retracting and deploying roller shades or blinds.

Description of the Related Arts

A roller shade is a window covering that uses a roller that rotates to retract or release a screen. A roller blind is a window covering that uses a roller that rotates to retract or release vanes of the blind. A cordless window covering is one that allows the user to control the retraction or the release by applying a force directly on the screen or the vanes without the use of a separate controller such as a controlling cord or rod.

A conventional cordless window covering employs a spring and a balance controller to control the release and the retraction. As the user pulls the bottom rail (or the bottom of the blind) downward to release, the spring is winded and energy is stored for subsequent upward retraction. To hold the screen at a particular position, the user jerks the screen to activate the balance controller. However, the jerking motion is difficult to execute when the user wish to hold the blind at a high position. In addition, the spring exert more upward torque when the screen is nearly fully released than when the screen is nearly fully retracted, making it more unruly to perform the jerking motion to hold the screen at a desired position.

SUMMARY

Some embodiments of the disclosure provide an apparatus for cordlessly retracting and releasing a roller blind or a roller shade is provided. The apparatus allows the user to effectuate repositioning the shade or blind at a desired position, by lightly tapping or touching or maneuvering the shade or blind. The apparatus includes a screen and a roller tubing that rotates to release or retract the screen. The screen has a bottom rail attached to its bottom. The apparatus includes a lifting spring that is pre-torqued for rotating the roller tubing to lift the screen. The apparatus also includes a rotation damper for providing a friction to dampen or stop a rotation of the roller tubing. The lifting spring is pre-compressed to provide sufficient torque and energy to retract the screen. The bottom rail is configured to match the torque produced by the lifting spring to achieve an equilibrium when the user is not touching the screen. In some embodiments, the bottom rail weighs more than the screen, or more than half of the screen.

In some embodiments, a downward torque provided by the bottom rail and an upward torque provided by the lifting spring are in an equilibrium of holding the screen in a same position. A static friction of the rotation damper is used to reach and hold the equilibrium and a dynamic friction of the rotation damper is used to dampen the motion of the screen and the roller tubing. In some embodiments, the rotation damper has a frictional surface that is configured based on (i) an expected difference between the downward torque and the upward torque during the equilibrium, and (ii) an expected torque change at the roller tubing due to a user contact of the screen. The frictional surface provides a static friction that is greater than the expected difference between the downward torque and the upward torque during the equilibrium and less than the expected torque change at the roller tubing due to the user contact of the screen.

In some embodiments, the rotation damper has a bead wheel for receiving a bead chain for providing a torque to rotate the roller tubing. In some embodiments, the rotation damper has a damper spring for providing an additional upward torque or downward toque whenever the user touches the screen.

In some embodiments, a core rod is in the roller tubing that does not rotate with the roller tubing. A first end of the lifting spring is rotationally coupled to the core rod and a second end of the lifting spring is fastened to a rotation connector that is rotationally coupled with the roller tubing. In some embodiments, a rotation balancer is used to control the lifting spring. The rotation balancer has a balancer body that is rotationally coupled to the core rod and a balancer rotator that is rotationally coupled to the roller tubing. Rotating the balancer body adjusts an amount of torque generated by the lifting spring. In some embodiments, the rotation balancer has a bead wheel for receiving a bead chain for rotating roller tubing.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a novel cordless window covering system for retracting and releasing a roller blind or a roller shade. The user may effectuate release or retraction of the shade or blind, or stopping the shade or blind at a desired position, by lightly tapping or touching or maneuvering the shade or blind. The blind or shade is attached to a roller, which may rotate to release or retract the blind or shade. The roller has a balance controller for controlling the rotation of the roller. A lifting spring is fastened to a core rod at a first end and is fasten to a rotation synchronizer at a second end. The lifting spring is pre-compressed or pre-torqued to provide sufficient torque and energy to lift the screen up regardless of the position of the screen. The bottom rail of the blind or shade is weighted (by e.g., a weighted rod insert) and configured to match the torque produced by the lifting spring to achieve an equilibrium. A rotation damper is used to dampen the upward and downward movement of the blind or screen, as well as to provide the friction to hold the equilibrium by compensating for small deviations from the equilibrium. As the roller rotates to release the blind, the weight of the unfurled vanes or screen is added to the bottom rail to counter act the additional torque generated by the winding of the lifting spring, thereby maintaining equilibrium. A light touch by the user would overcome the equilibrium, allowing release or retraction of the blind. The equilibrium is re-established when the use ceases touching the blind at another position.

In some embodiments, the rotation synchronizers are installed in the roller to ensure the torque is uniformly distributed throughout the roller. This helps to ensure that the release and the retraction of the screen is even across the width of the window covering, and that tension on the screen is also even. This also helps to maintain the equilibrium between the weight of the screen and the torque of the lifting spring.

Figure 1:
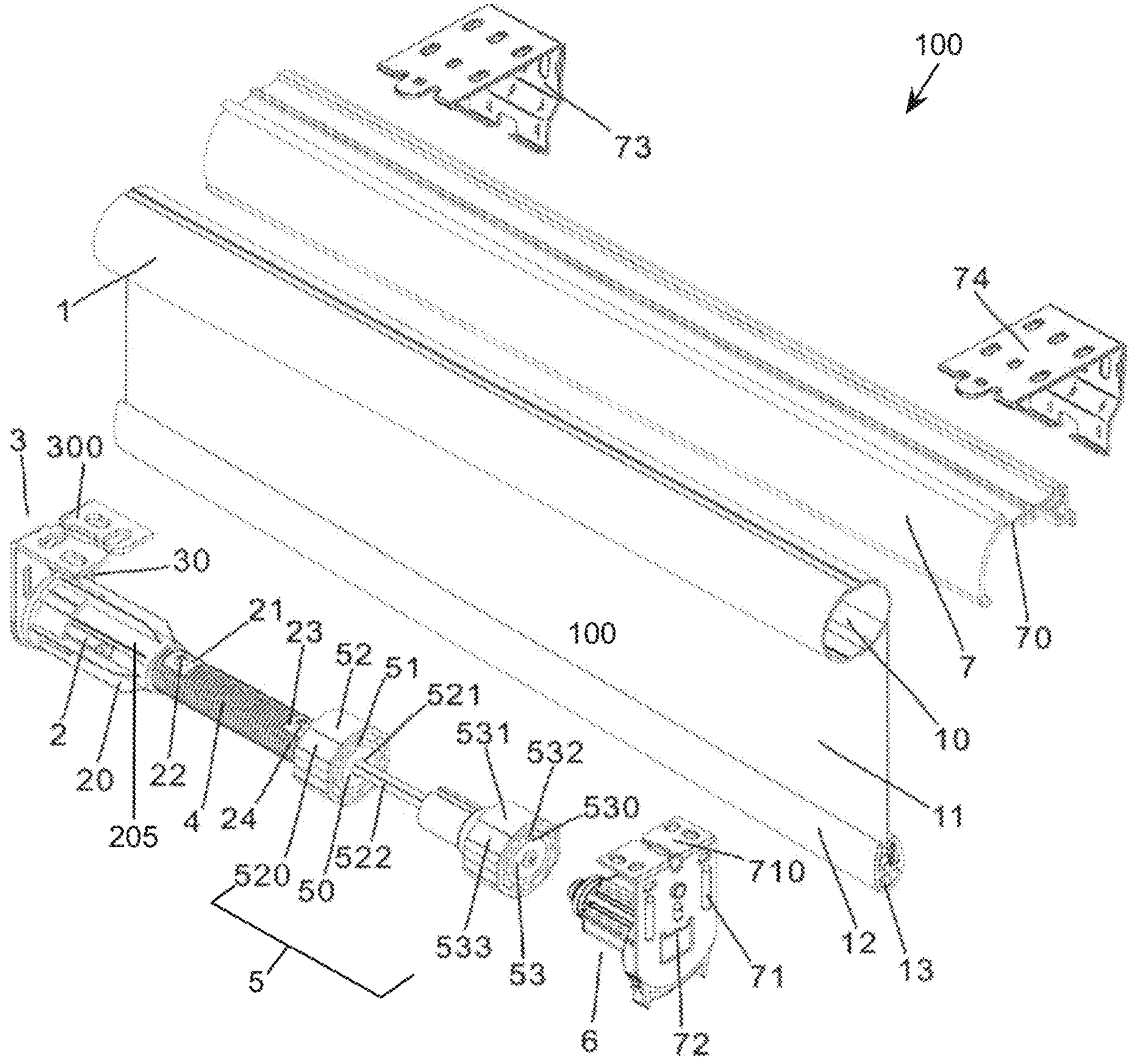
FIG. 1 conceptually illustrates components of a light-touch window covering system.

FIG. 1 conceptually illustrates components of a light-touch window covering system 100. As illustrated, the system has a roller 1 (or roller tubing) with a hallow core. The hollow core of the roller 1 has several interior flat surfaces 10. A screen 11 is rolled up about the roller 1. A lifting spring 4 is used to provide the torque to lift the screen. Furthermore, the lifting spring 4 is pre-compressed or pre-torqued to provide sufficient torque to retract the entire screen, regardless of the position of the screen (whether nearly fully released or fully retracted). At bottom of the screen 11 has a weighting rod 13 as a weighted insert to implement a bottom rail 12. The weight of the weighting rod 13 is chosen to match the torque produced by the lifting spring 4. In some embodiments, the weighting rod 13 weighs more than the screen 11. In some embodiments, the weighting rod 13 weighs more than half of the screen 11. In some embodiments, when the user is not touching the screen 11 or the bottom rail 12, the weight of bottom rail 12 and the torque lifting spring 4 can reach an equilibrium; when the user is touching the screen to reduce the weight of the bottom rail, the lifting spring 4 has sufficient torque and energy to retract the entire screen.

Figure 2:
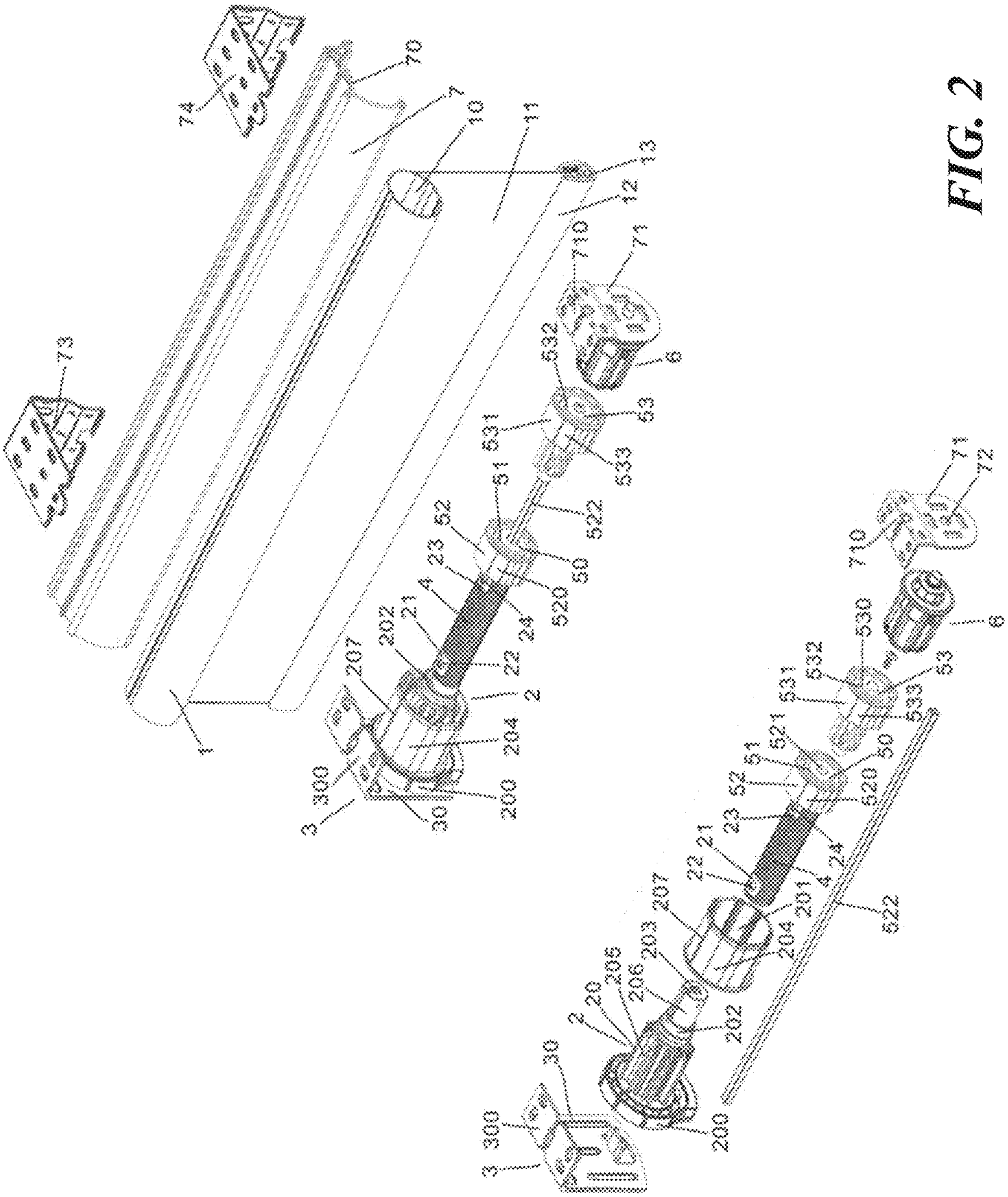
FIG. 2 shows an assembly of the light-touch window covering system.

A core rod 522 is disposed in the center hallow of the roller 1. The roller 1 may freely rotate about the core rod 522. The core rod 522 is used to support various components to be installed within roller 1. A rotation balancer 2 is rotationally synchronized or affixed to the core rod 522. The rotation balancer 2 also controls one end of the lifting spring 4. The torque provided by the lifting spring 4 is configured to be in balance or equilibrium with the weight of the screen 11 (including the bottom rail 12). FIG. 2 shows an assembly of the light-touch window covering system 100 in greater detail.

As illustrated, the rotation balancer 2 has a spring interface 202 and a spring connector 206. The spring connector 206 has a square-shaped through hole 203 that fits with the core rod 522, which also has a square-shaped cross section. The rotation balancer 2 has a rotator 205 that can freely rotate about the rotation balancer 2. The rotator 205 has several rotator fins 20. A rotator sleeve 201 may be installed over the rotator fins 20. The rotator sleeve 201 includes flat surfaces 204 for fitting with the flat surfaces 10 of the roller 1. The rotator sleeve 201 has an opening 207 that allows the rotator sleeve 201 to be installed or removed without affecting the rest of the assembly. The rotator 205 (and the rotator fins 20) is rotationally synchronized with the roller 1 and rotate about the rotation balancer 2.

The rotation balancer 2 is installed at one end of the core rod 522. One end of the rotation balancer 2 is installed at a plate 30 of an affixing bracket 3. The affixing bracket 3 has a perpendicular insert plate 300. The insert plate 300 can be inserted into groove 70 of a railing 7. Thus, the rotator 205 (and the rotator fins 20) can rotate with the roller 1 about the plate 30 of the affixing bracket 3. In some embodiments, the rotation balancer 2 may include an optional balancer body 200, which can be used to adjust the torque of the lifting spring 4 or to pre-torque the lifting spring 4.

A first end of the lifting spring 4 is fastened to the spring connector 206 of the rotation balancer 2 by a fastener 22 through a gasket 21. The first end of the lifting spring 4 is therefore rotationally affixed to the core rod 522 and does not rotate with the roller 1. A second end of the lifting spring 4 is fastened to a rotation synchronizer 5 by a fastener 24 (and another gasket that is similar to gasket 21) so will rotate with the roller 1. The rotation balancer 2 may be held in place to rotationally hold the first end of the lifting spring 4, while the second end of the lifting spring 4 unwind to drive the roller 1. Conversely, the roller 1 may be held in place to rotationally hold the second end of the lifting spring 4, while the rotation balancer 2 rotates the first end to pre-torque the lifting spring 4.

The rotation synchronizer 5 has a connector 50, the top surface of which has a driving protrusion 51. The driving protrusion 51 is used to mate with a hybrid connector 52 to synchronize rotation. The exterior of the connector has several flat surfaces 520 that fit with the interior flat surfaces 10 of the roller 1 for synchronizing rotation with the roller 1. At the center of the hybrid connector 52 is a through hole 521 for the core rod 522 to go through, however, the through hole 521 is circular shaped such that the hybrid connector 52 is free to rotate about the core rod 522. The rotation synchronizer 5 has another connector 53, the top surface of which has a driving protrusion 530. The driving protrusion 530 is used to mate with a hybrid connector 531 at a groove 532. The hybrid connector 531 is also free to rotate about the core rod 522 as it is circular shaped. The rotations of the hybrid connectors 52 and 531 (of the rotation synchronizer 5) are driven by the lifting spring 4. The flat surface 533 of the hybrid connector 531 fits with the interior flat surface 10 of the roller 1 so that the roller 1 will rotate with the rotation synchronizer 5. Rotation synchronizers are described in greater detail in U.S. patent application Ser. No. 17/938,909, filed on Sep. 6, 2022.

Figure 3:
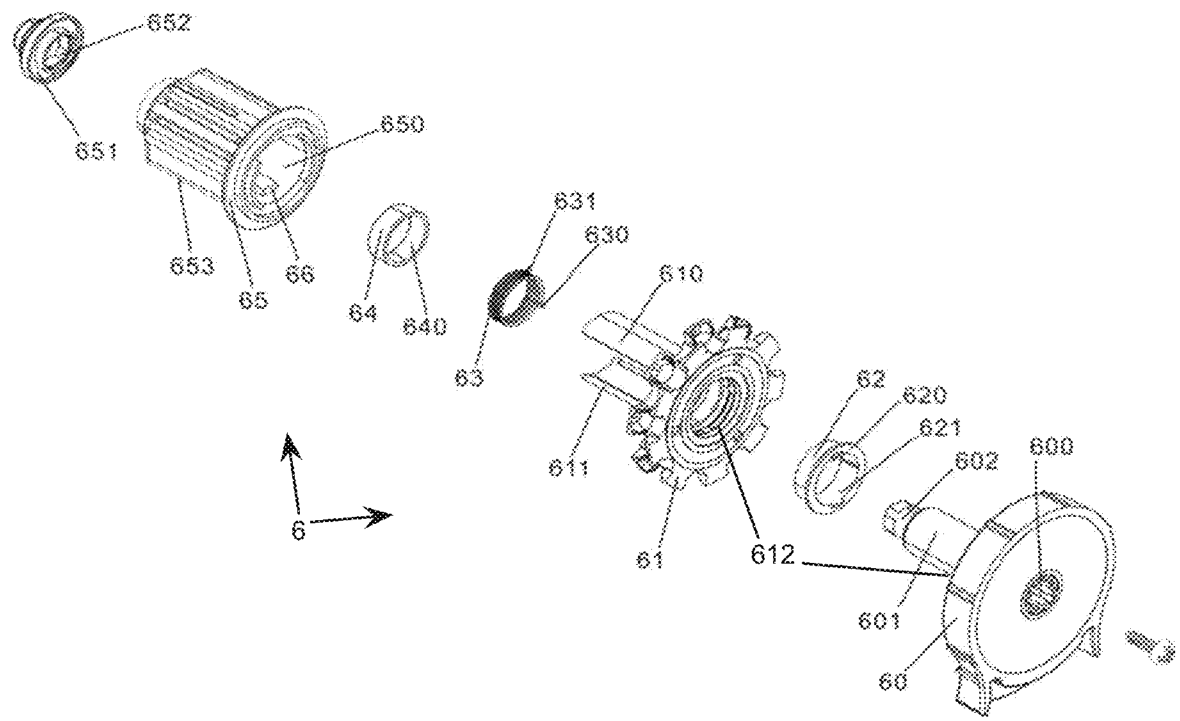
FIGS. 3-4 illustrate a rotation damper in greater detail.
Figure 4:
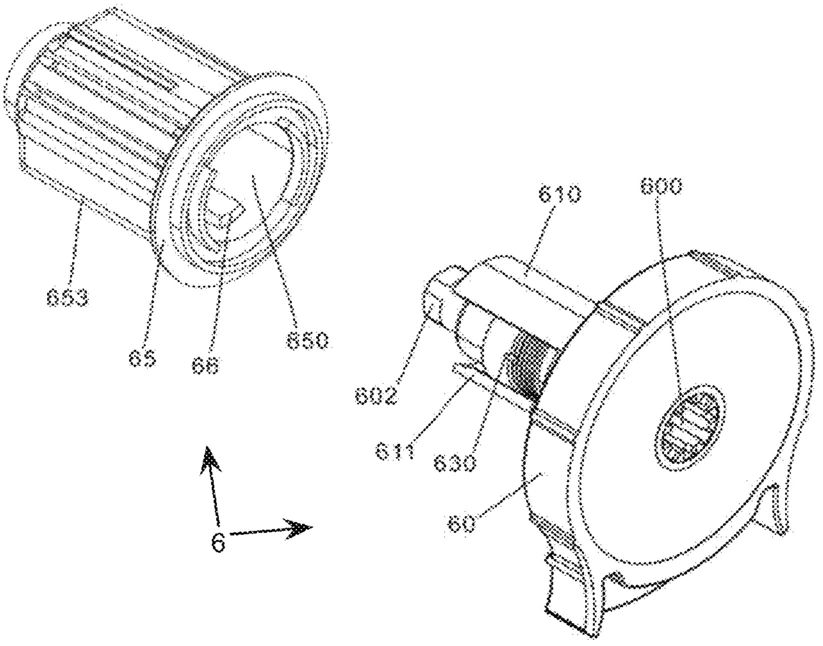

A rotation damper 6 is installed at the other end of the roller 1 for damping the rotation of the roller 1 and for stopping the rotation when the roller 1 is near equilibrium (e.g., when the user is not touching the screen 11 or the bottom rail 12.) FIGS. 3-4 show the rotation damper 6 in greater detail. The rotation damper 6 is an assembly of a damper body 60, a bead wheel 61, a positioning sleeve 62, an optional damper spring 63, a fitting sleeve 64, a covering cylinder 65, a damper cap 651. The damper body 60 has an aperture 600, allowing an inserting plate 72 of an affixing bracket 71 to mate. The affixing bracket 71 has another inserting plate 710 for mating with the railing 7 at the groove 70. The damper body 60 has a damper core 601 at its center. The damper core 601 has core driver 602 at its core. The bead wheel 61 has arches 610 and 611 for receiving the damper core 601. The positioning sleeve 62 has a flange 620, which has a through hole 621 at its center. The through hole 621 is used to affix the positioning sleeve 62 at the damper core 601 of the damper body 60. The (optional) damper spring 63 has spring heads 630 and 631 at two ends, also installed at the at the damper core 601 of the damper body 60. The fitting sleeve 64 is at the frontend of the damper spring 63 and has a center hole 640. The center hole 640 is used to recess the damper core 601 of the damper body 60, allowing the spring 63 to be affixed.

The covering cylinder 65 has several fitting fins 653 for abutting the interior of the roller 1 for rotation synchronization with the roller 1. The covering cylinder 65 also has a through hole 650, allowing the arches 610 and 611 of the bead wheel 61 to go through, to mate with the bead wheel 61. This allows an assembly of the damper core 601, the positioning sleeve 62, the damper spring 63, and the fitting sleeve 64 to be all contained within the covering cylinder 65. The damper cap 651 has a fixing groove 652 assembled with the damper core 601 and the core driver 602 at frontend.

The bead wheel 61 (with arches 610 and 611) can be driven to rotate about the damper core 601, by a bead controller 90 installed on the bead wheel, or by the roller 1 via the covering cylinder 65. The damper core 601 is part of the damper body 60, which is affixed to the fixing bracket 71 and does not rotate. In some embodiments, the friction at the interface or contact surface 612 between the non-rotating damper core 601 and the rotating bead wheel 61 provides the damping effect of the rotation damper 6 and the light-touch system 100. Specifically, when the user touches the screen 11 or the bottom rail 12 to reposition the screen, the dynamic friction of the interface slows the rotation of the roller 1. When the user stops touching the screen 11 or the bottom rail 12, the static friction of the interface halts and maintains the equilibrium between the downward torque of the bottom rail 12 and the upward torque of the lifting spring 4.

In some embodiments, the contact surface or interface 612 between damper core 601 and the rotating bead wheel 61 is configured to have a specific friction characteristic. In some embodiments, a friction tape of the specified friction characteristics is installed at the contact surface. In some embodiments, the friction characteristic is specified based on (i) the expected difference (or a range thereof) between the downward torque (generated by the weight of the bottom rail 12 and the screen 11) and the upward torque (generated by the lifting spring 4) and (ii) the expected change in torque caused by the user's contact with the screen. For example, the specified friction characteristic may provide a static friction that is greater than (i) but less than (i)+(ii). As the screen 11 unfurls from the roller 1 tubing, the expected difference (i) may be further based on additional downward torque caused by the unfurled screen weighing on the roller 1 tubing and additional upward torque caused by further compression on the lifting spring 4.

Figure 6:
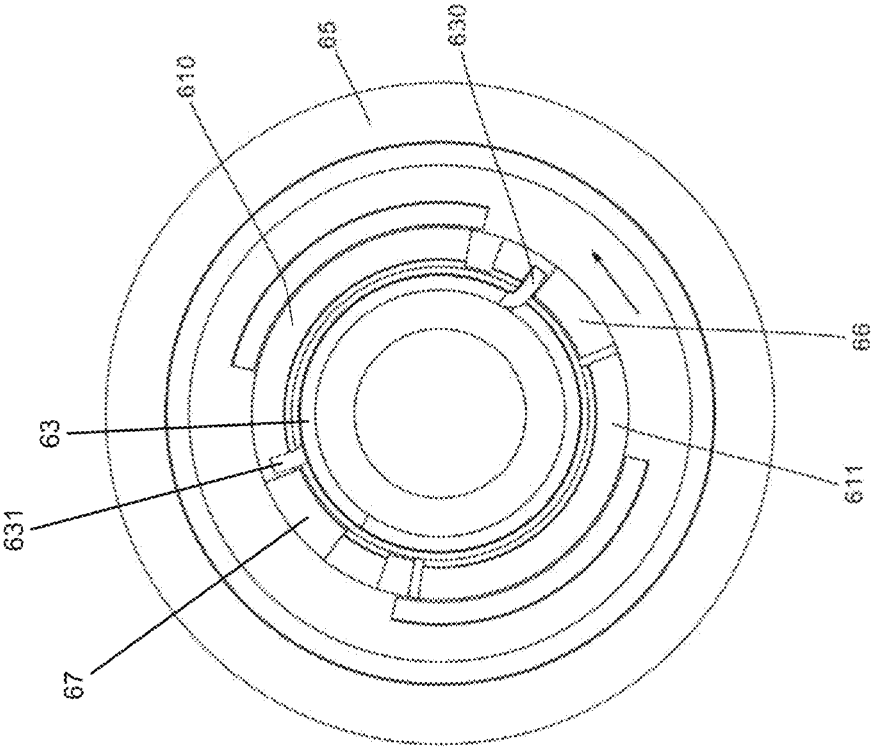
FIGS. 5-6 illustrate the interior of a covering cylinder of the rotation damper.
Figure 5:
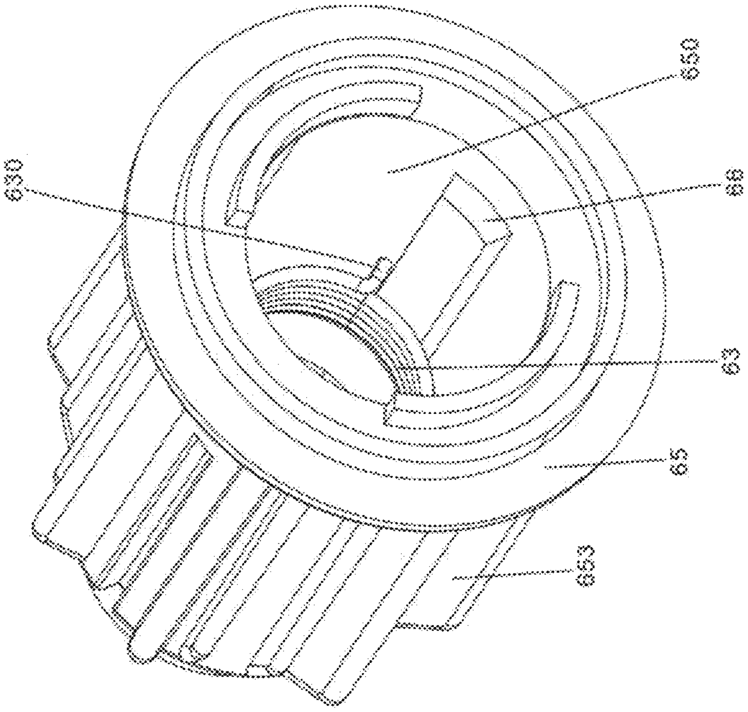

In some embodiments, the optional damper spring 63 is used to provide an additional upward torque or downward toque whenever the user touches the system to reposition the screen. This additional torque may be used to smooth the motion of the screen or blind when the screen starts or stops moving. FIGS. 5 and 6 illustrate interior of the covering cylinder 65 of the rotation damper 6. At the interior of the covering cylinder 65 are two corresponding protrusions 66 and 67. The covering cylinder 65 may be installed onto the bead wheel 61 such that the protrusion 66 may be used to drive the spring head 630 in a direction that loosens the damper spring 63. This allows the cylinder 65 to drive the rotation of the bead wheel 61 (by driving the arches 610 and 611) subject to the damping effect at the friction interface between the damper core 601 and the bead wheel 61.

Figure 7:
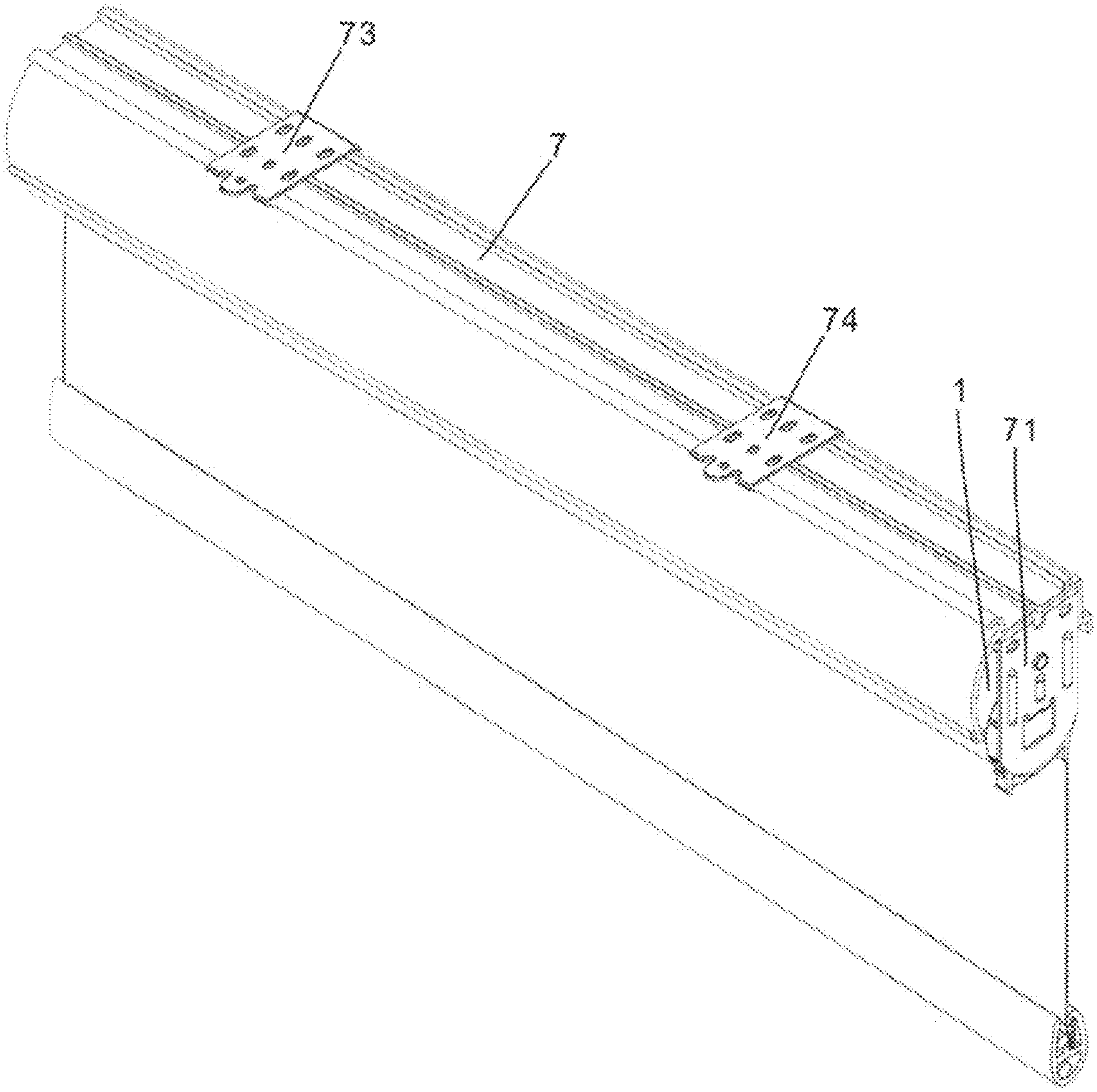
FIG. 7 illustrates an assembled light-touch window covering system.

The rotation balancer 2, the lifting spring 4, the rotation synchronizer 5, and the rotation damper 6, are installed at two ends of the roller 1 and along the core rod 522 to complete the light-touch window covering system 100. FIG. 7 shows an assembled light-touch window covering system. As illustrated, the affixing brackets 3 and 71 support the two ends of the roller 1 in an assembly under the railing 7. Above the railing 7 are installation brackets 73 and 74 for installing the light-touch window covering system 100 as an inside mount of a window 8.

Figure 8:
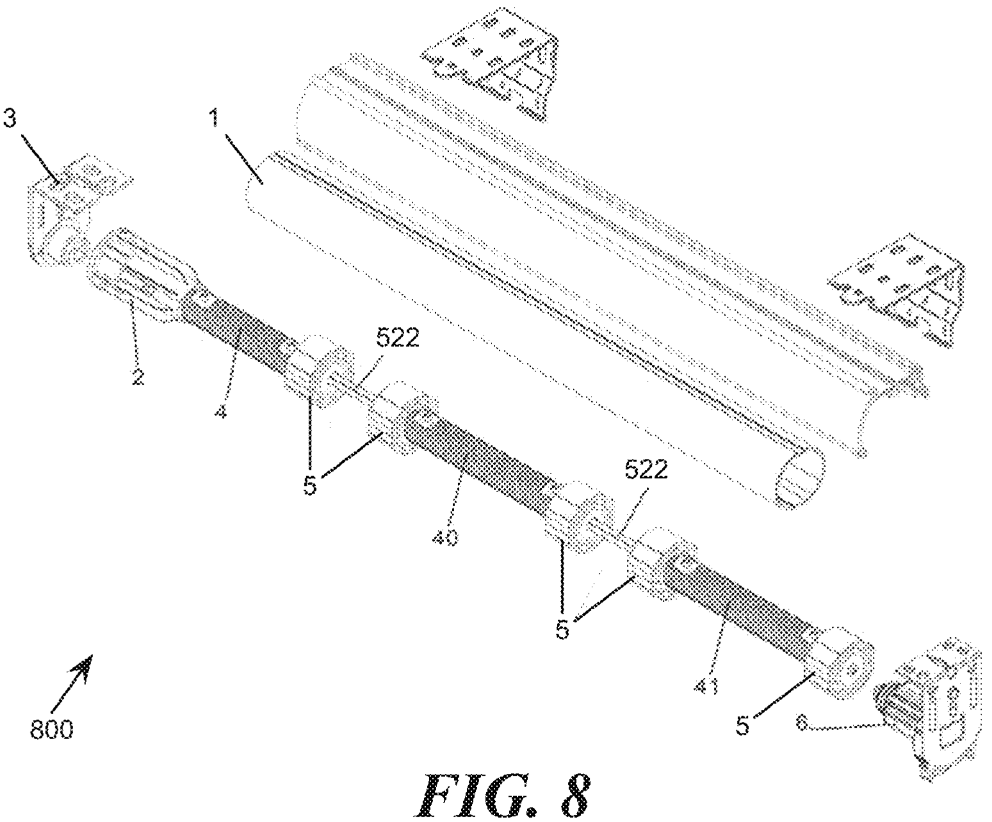
FIGS. 8-9 show a light-touch window covering system that uses multiple lifting springs.

In some embodiments, a light-touch window covering system may include multiple springs for providing the upward lifting torque. FIG. 8 shows a light-touch window covering system 800 that uses multiple lifting springs. The light-touch window covering system 800 uses the rotation balancer 2 in conjunction with the lifting spring 4, two additional lifting springs 40 and 41, and the rotation synchronizer 5 in the roller 1 for stability and balance. There are gaps between the lifting springs 4, 40, and 41, and the core rod 522 (having a square cross-section) is used to connect them. One end of each of lifting springs 4, 40, and 41 are fastened to the core rod 522 so do not rotate with the roller 1. The other end of each of lifting springs 4, 40, and 41 are affixed to connectors of the rotation synchronizer 5 so freely rotate with the roller 1.

The rotation damper 6 is installed at the roller 1. The roller 1 has lifting cord 43 wrap around it for lifting vanes 44 and a bottom rail 45. This forms a light-touch cordless control system for a wider roller shade or roller blind. The lifting springs 4, 40, and 41 are chosen to have a specific force-to-extension characteristics and pre-compressed to match the weight of the bottom rail 45 to form an equilibrium. When the vanes 44 are pulled to different vertical positions, the weight of the bottom rail 45, the torque of the lifting springs 4, 40, and 41 of the rotation synchronizer 5, and the torque caused by the weight of the vanes 44, causes the torque on the roller 1 to be in an equilibrium. To lift or retract the vanes 44 upward, the user may lightly touch the bottom rail 45 or the lifting cord 43, which reduces the effect of the weight of the bottom rail 45, thereby temporarily send the system out of equilibrium. The tensile force on the lifting cord 43 releases the torque in the lifting springs 4, 40, 41, using the torque to drive the roller 1 to rotate. The rotation damper 6 with its covering cylinder 65 is also driven to rotate. The friction in the rotation damper 6 dampens the rotation of the roller 1. When the user stops touching the bottom rail 45 or the lifting cord 43, the roller 1 stops rotation and return to equilibrium between the downward torque of the bottom rail 45, the upward torque of the lifting springs 4, 40, and 41, and the friction in the rotation damper 6.

Figure 9:
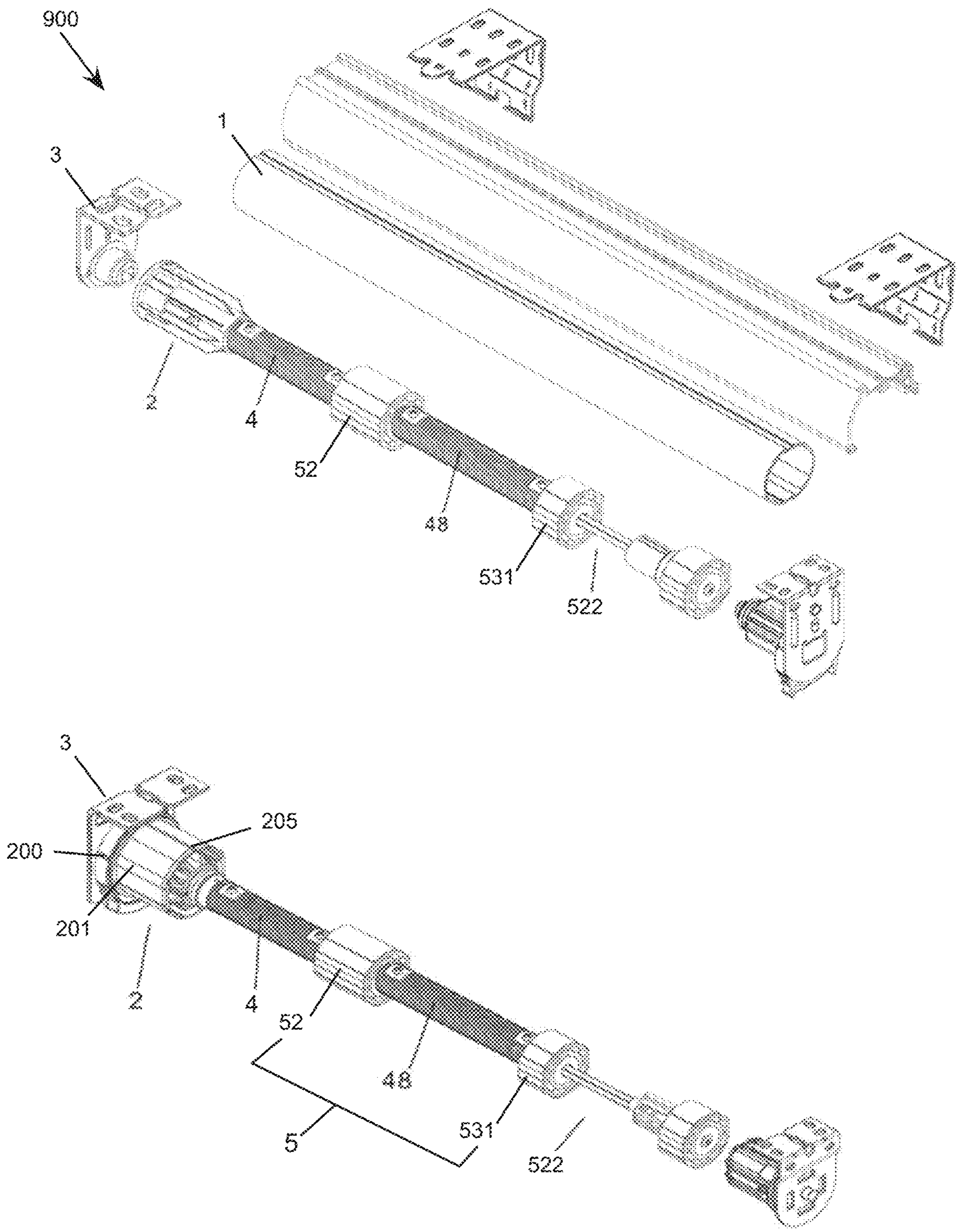

FIG. 9 illustrates an alternative implementation of the light-touch window covering system 900 that uses multiple lifting springs. As illustrated, in the light-touch window covering system 900, the rotation synchronizer 5 and the rotation damper 6 are installed together with the roller 1. The rotation balancer 2 is connected to the lifting spring 4 and an additional lifting spring 48 for generating synchronized torque. Each of the two lifting springs 4 and 48 has a first end fastened to the core rod 522 and does not rotate with the roller 1. The two lifting springs 4 and 48 each has a second end fastened to components of the rotation synchronizer 5 so are free to rotate about the core rod 522 together with the roller 1. The rotator sleeve 205 may be installed over the rotator 205 of the rotation balancer 2.

In some embodiments, the light-touch window covering system provide a mechanism for pre-torquing the lifting spring. A user may rotate the lifting spring at one end to tighten or loosen the spring coil, thereby increasing or decreasing the torque energy stored within. In other words, the user can adjust the tightness of the spring to better achieve balance or equilibrium of the light-touch system.

Figure 10:
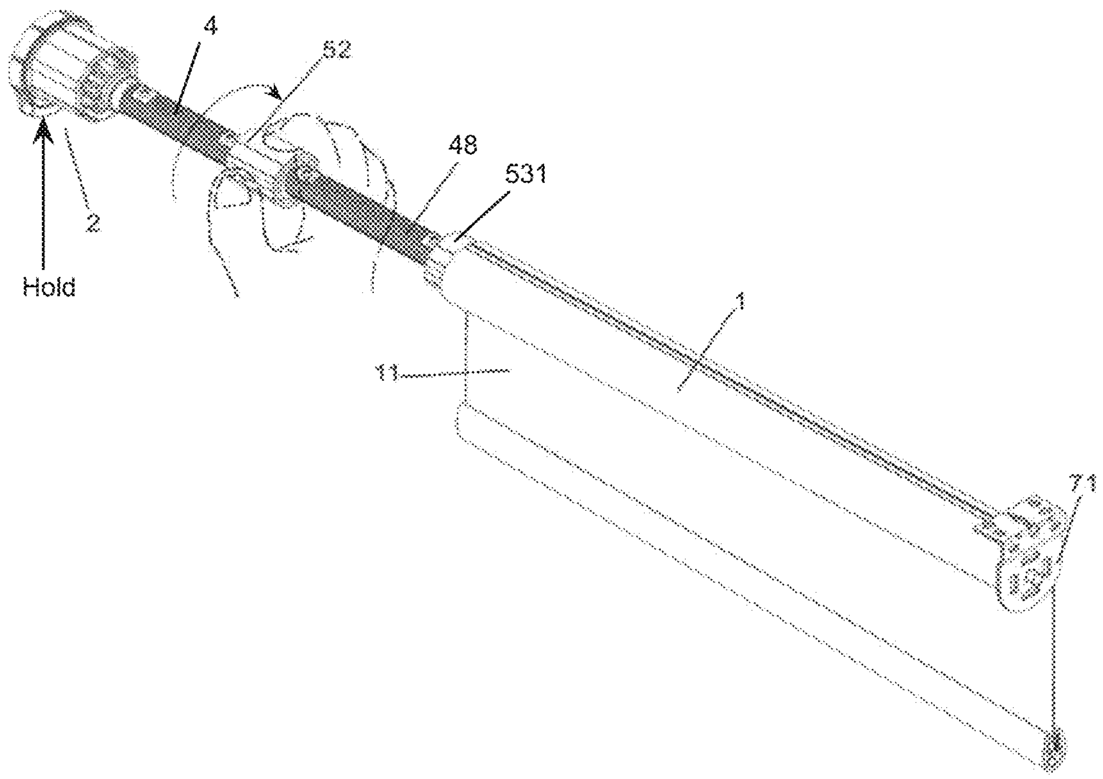
FIGS. 10-11 illustrate using the rotation synchronizer to pre-torque the lifting spring.
Figure 11:
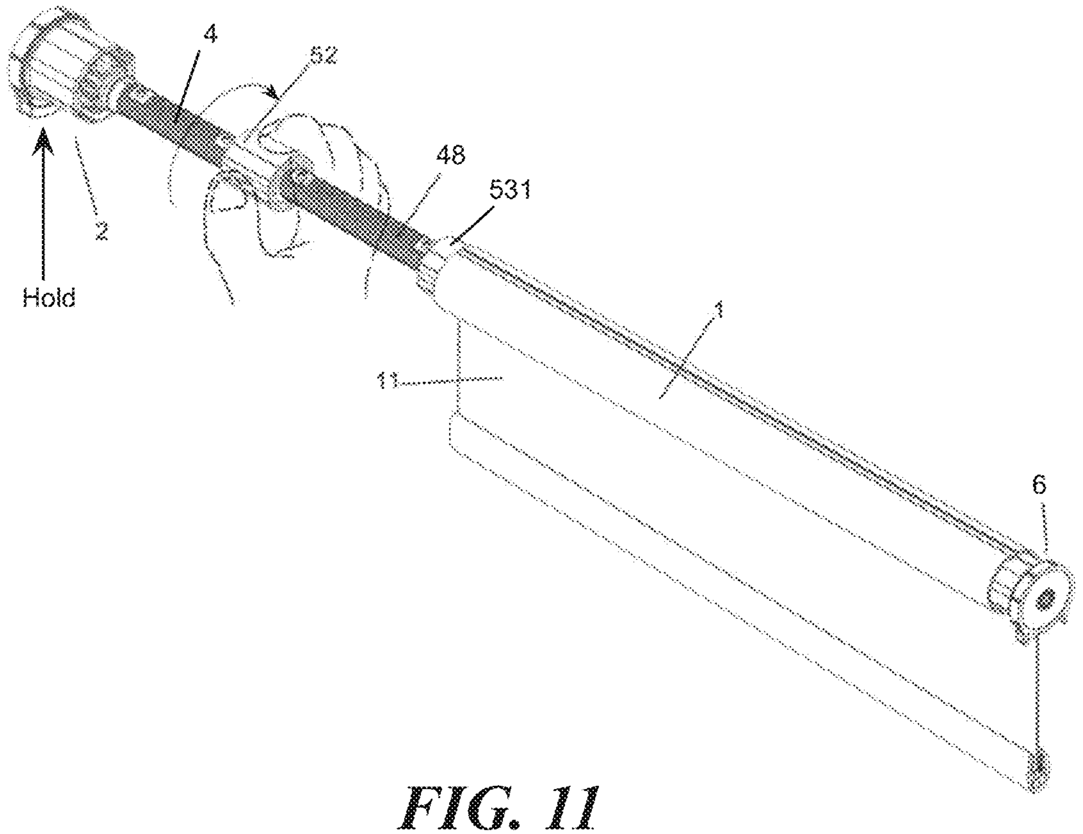

FIGS. 10-11 illustrate using the rotation synchronizer to pre-torque the lifting spring. Specifically, the user rotates some components of the rotation synchronizer 5 relative to the rotation balancer 2 pre-torque the lifting spring. As illustrated, the user partially pulls out a portion of the assembly from the roller 1. The rotation balancer 2 and the hybrid connector 52 (of the synchronizer 5) are exposed outside of the roller 1 tubing. The user turns the hybrid rotator 52 clockwise while holding the rotation balancer 2 to not rotate. Thus, one end of the spring 4 is held to not rotate by the rotation balancer 2, while the other end of the spring 4 rotates along with the hybrid connector 52. This operation pre-torques the lifting spring 4 to have additional torque in the counterclockwise direction, which is opposite of the downward clockwise torque generated by the weight of the screen 11. (One of ordinary skill would understand that the characterization of the rotation as being clockwise or counterclockwise is based on the perspective of the viewer of the example figures.) FIG. 10 shows one end of the roller 1 tubing being installed at the affixing bracket 71. FIG. 11 shows the rotation damper 6 behind the affixing bracket.

Figure 12:
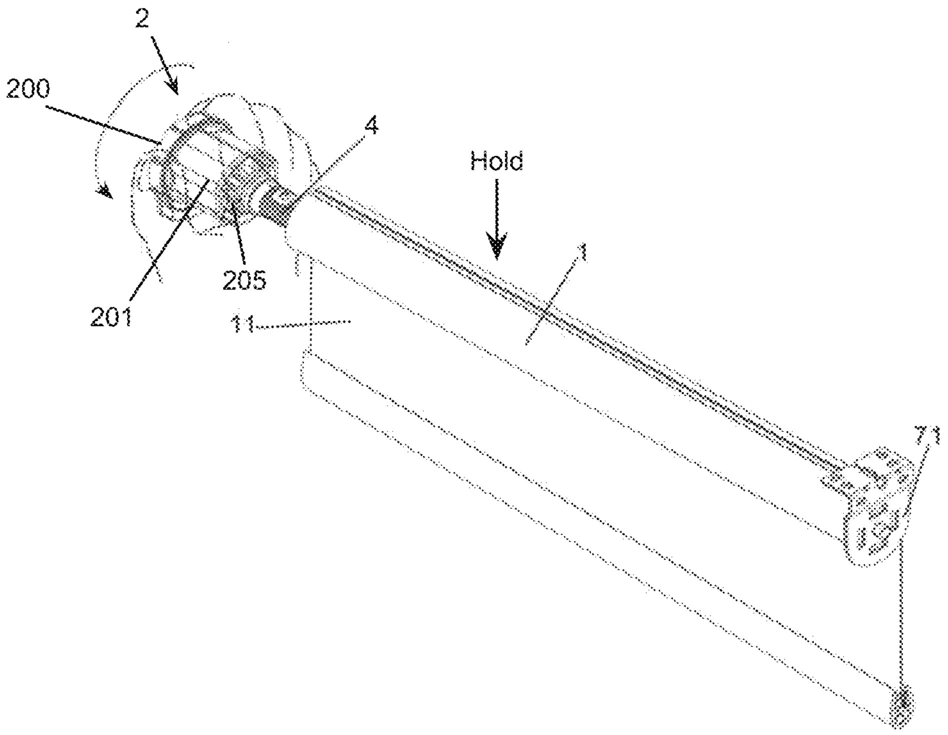
FIGS. 12-13 illustrate using the rotation balancer to pre-torque the lifting spring.
Figure 13:
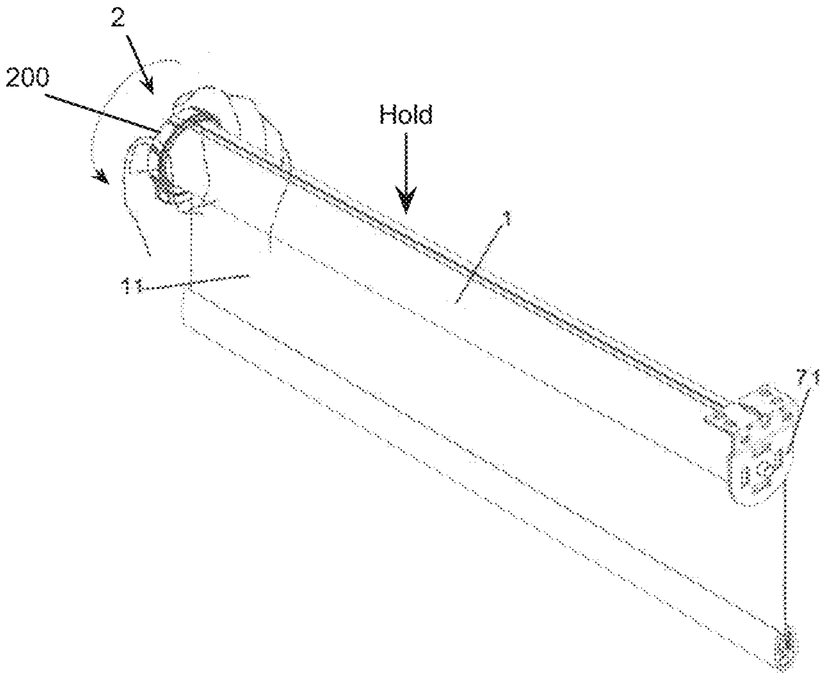

FIGS. 12-13 illustrate using the rotation balancer 2 to pre-torque the lifting spring. Specifically, the user may rotate the rotation balancer 2 relative to the roller 1 tubing. As illustrated, the user turns the rotation balancer 2 counterclockwise while holding the roller 1 tubing. The components within the roller 1 such as the hybrid connectors 52 and 531 are also not allowed to rotate. Thus, one end of the spring 4 is driven to rotate by the rotation balancer 2, while the other end of the spring 4 is held to not rotate by the hybrid connector 52 and the roller 1. This operation pre-torques the lifting spring 4 to have additional torque in the counterclockwise direction, which is opposite of the downward clockwise torque generated by the weight of the screen 11. (The user may torque the rotation balancer 2 by rotating the balancer body 200 counterclockwise without affecting the roller 1, regardless of whether the rotation balancer 2 is within the roller 1.)

After pre-torquing, the rotation balancer 2 and the hybrid connector 52 may be installed into the roller 1 tubing along with the core rod 522. The roller 1 assembly may then be installed into the affixing brackets 3 and 71 for use by the light-touch window covering system. The rotation balancer 2 and the core rod 522 are held to not rotate by the affixing brackets 3 and 71. The roller 1 tubing and the hybrid connector 52 are rotationally synchronized and held to not rotate by the downward torque (clockwise) of the weight of the screen 11 (and bottom rail 12). This locks in the torque energy in the lift spring 4 generated by the pre-torquing operations.

Figure 15:
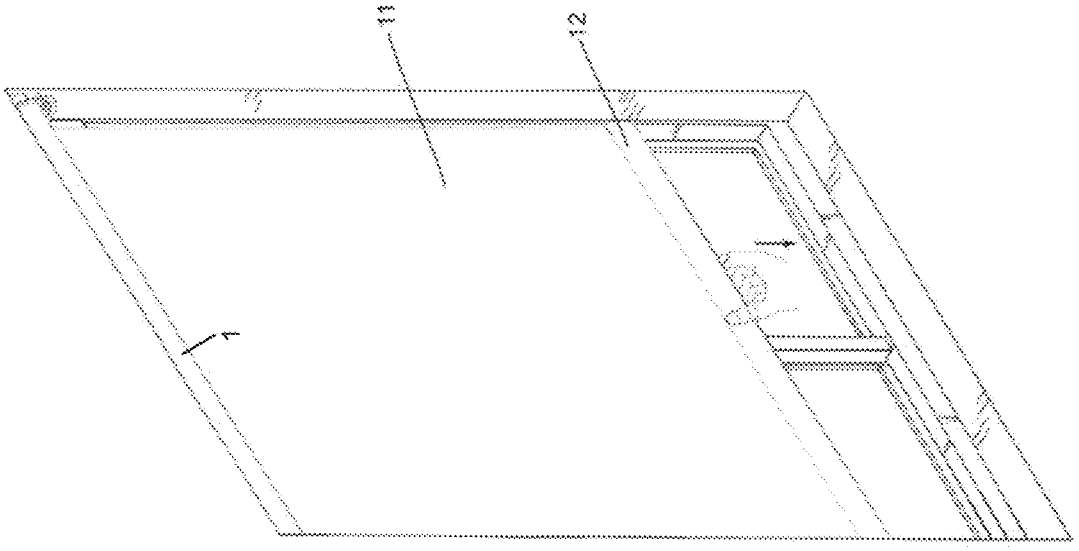
FIGS. 14-15 show the screen of the light-touch window covering system being lowered to different positions by light touch.
Figure 14:
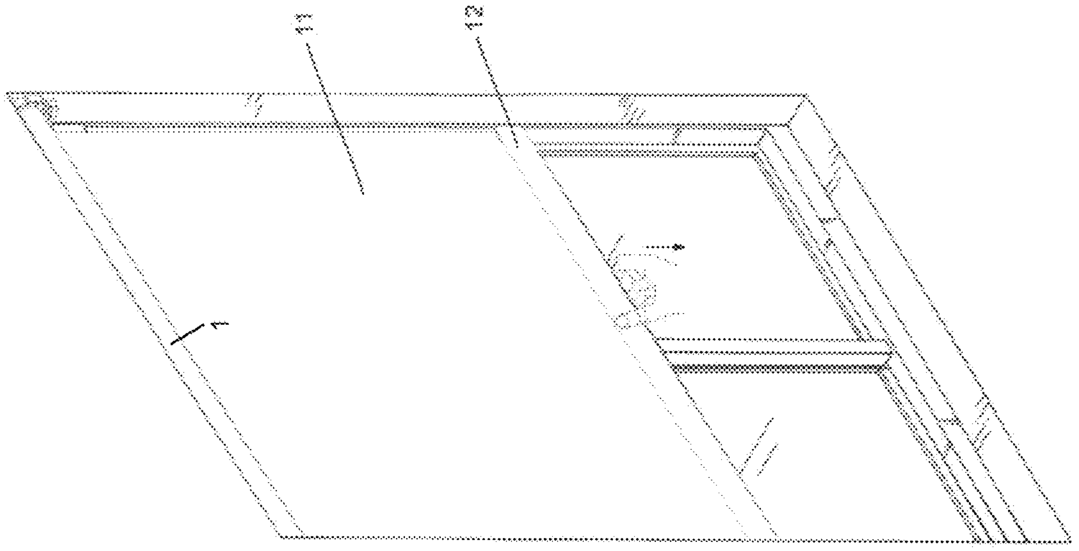

FIGS. 14-15 show the screen (or blind) of the light-touch window covering system 100 being lowered to different positions by light touch. The figures show an installed light-touch window covering system. To lower the screen 11, the user may touch the bottom rail 12 or the screen 11 to apply an additional downward force on the screen to change the equilibrium and overcome the friction. The additional downward force or torque on the roller 1 causes the rotation synchronizer 5 and the roller 1 to rotate. The roller 1 in turn drives the covering cylinder 65 in synchronized rotation. When user stops touching the screen, the weight of the bottom rail once again in equilibrium with the torque of the lifting spring 4, with the rotation damper 6 providing friction to dampen the rotation of the covering cylinder 65 (and thereby the roller 1) and to achieve and hold the equilibrium of the light-touch system 100. When the screen 11 is pulled down to different lengths, the downward force of the bottom rail 12 and the weighting rod 13 (and the weight of the screen 11), is in equilibrium with upward force exerted by the torque of the lifting spring 4, and held there by the friction of the rotation damper 6. Furthermore, the tension on the screen due to the weight of the bottom rail is uniform across, thereby allowing the screen to appear flat and even.

Figure 17:
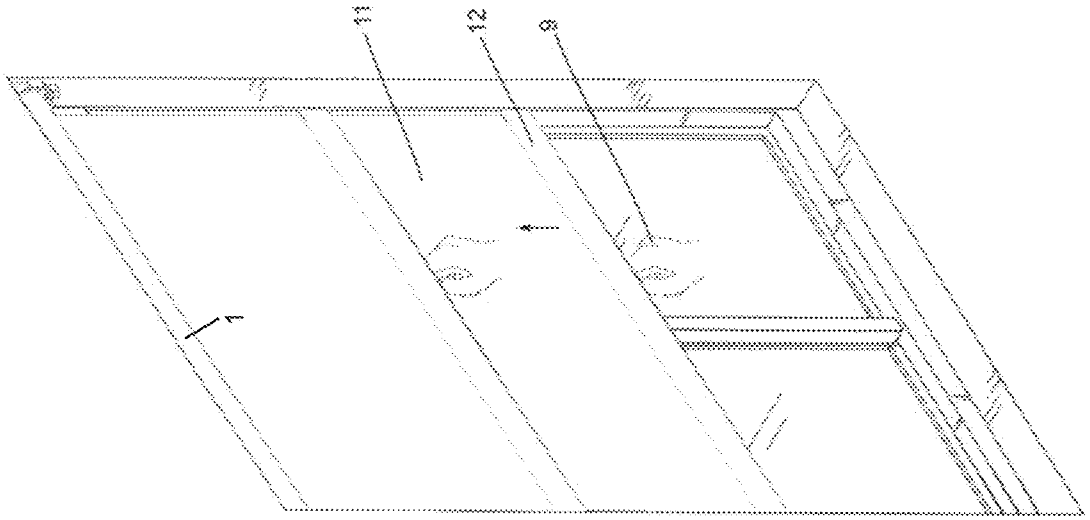
FIGS. 16-17 show the screen of the light-touch window covering system being lifted by light touch.
Figure 16:
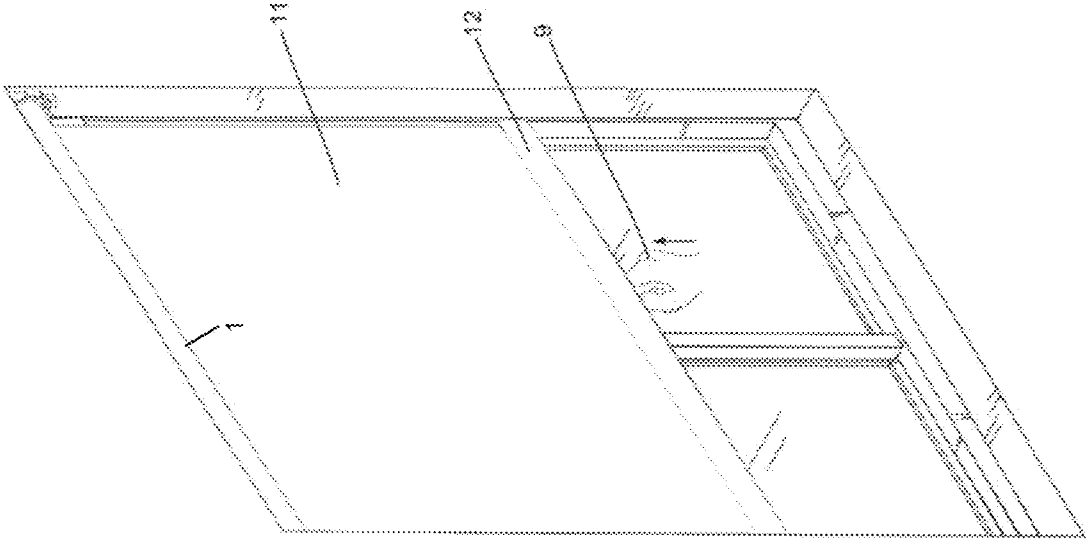

Conversely, the screen (or blind) can also be lifted by a light touch that changes the equilibrium. FIGS. 16-17 show the screen (or blind) of the light-touch window covering system being lifted (retracted) by light touch. To lift or raise the screen 11, the user may touch the bottom rail 12 or the screen 11 itself. The touch changes the downward force on the screen to change the equilibrium and overcome the friction. Together with the tensile force on the screen, the torque in the lifting spring 4 causes the rotation synchronizer 5 and the roller 1 to rotate. The roller 1 in turn drives the covering cylinder 65 in synchronized rotation. When user stops touching the screen, the weight of the bottom rail once again in equilibrium with the torque of the lifting spring 4, with the rotation damper 6 providing friction to dampen the rotation of the covering cylinder 65 (and thereby the roller 1) and to achieve and hold the equilibrium of the light-touch system 100. The rotation damper 6 is described by reference to FIGS. 3-6 above.

In some embodiments, an optional bead controller (or bead chain) can be included in a light-touch window covering system. For a cordless window covering system that is installed for a window at a higher position, the bead controller can be used to lower or raise the screen or the blind when the screen bottom is beyond the user's reach.

Figure 19:
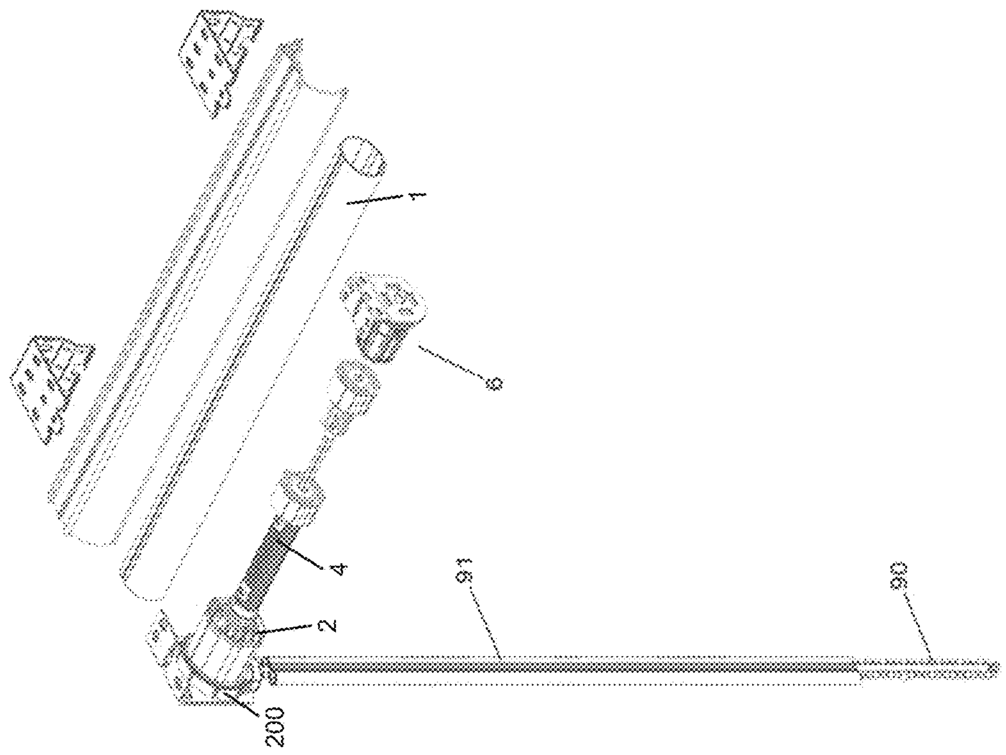
FIGS. 18-19 illustrate a light-touch window covering system with a bead controller.
Figure 18:
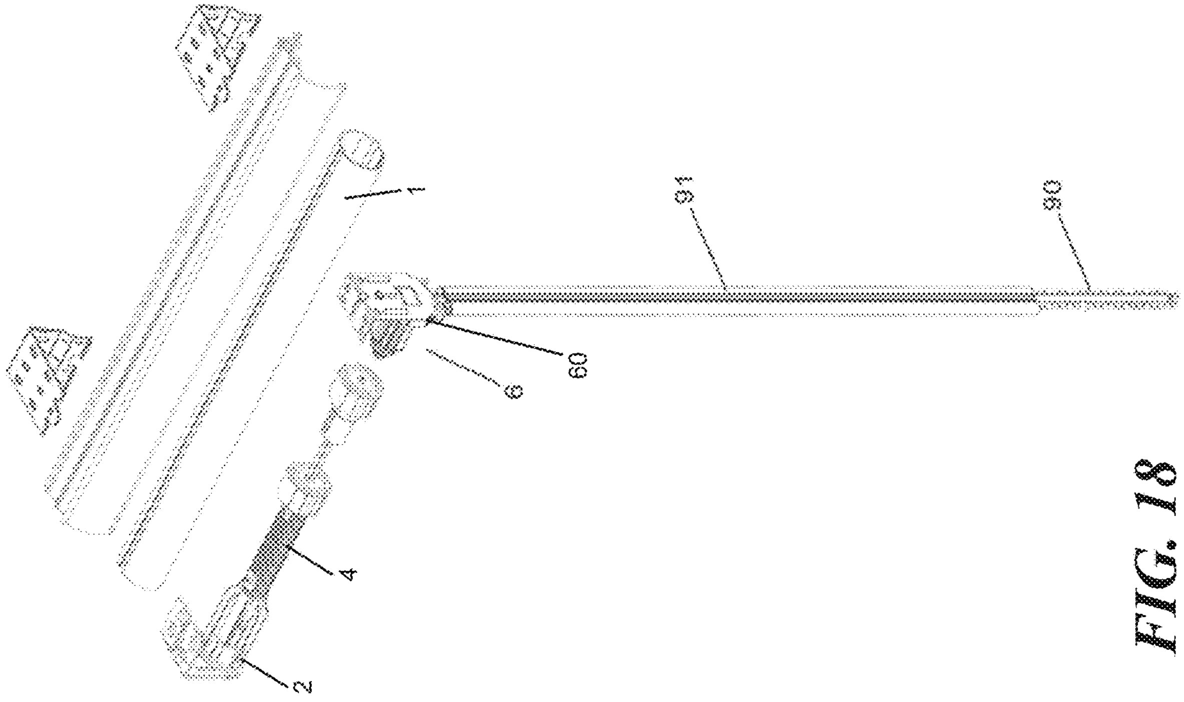

FIGS. 18-19 illustrate a light-touch window covering system with a bead controller. FIG. 18 illustrates a bead controller 90 that is installed at the bead wheel 61 inside the damper body 60 of the rotation damper 6. The bead controller 90 may be encased by a safety casing 91 to shield the beads chain to avoid accidents involving children playing the bead chain. To lower or raise the screen, the user may use the bead controller 90 to rotate the bead wheel 61, causing the arch 610 to drive the protrusion 66 to release the damper spring 63, allowing the covering cylinder 65 to rotate, allowing the screen 11 to be lowered to where the user may physically touch or hold the bottom rail 12. In some other embodiments, the bead controller may be installed at a bead wheel inside the balancer body 200 of the rotation balancer 2, as illustrated in FIG. 19.

Figure 21:
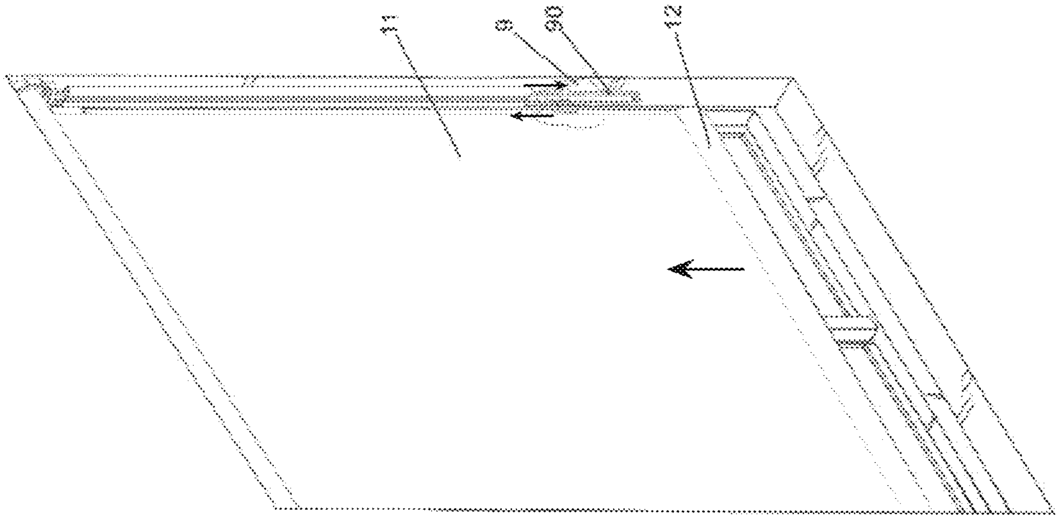
Figure 20:
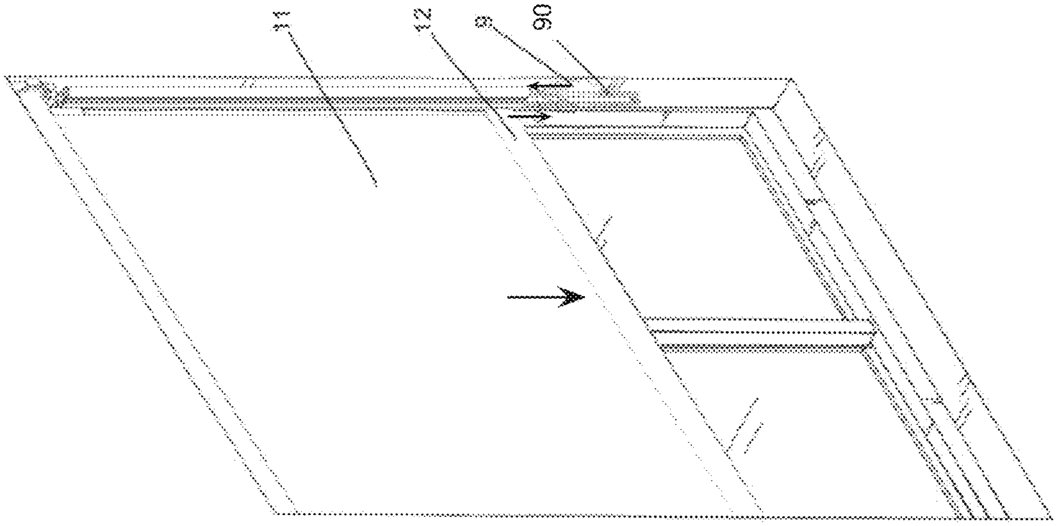

FIGS. 20-21 illustrate using the bead controller to lift or lower the screen in the light-touch window covering system 100. FIG. 20 illustrates pulling the screen down from a higher position to a lower position over a window using the bead controller 90. FIG. 21 illustrates raising the screen up from a lower position to a higher position over the window using the bead controller 90.

Figure 22:
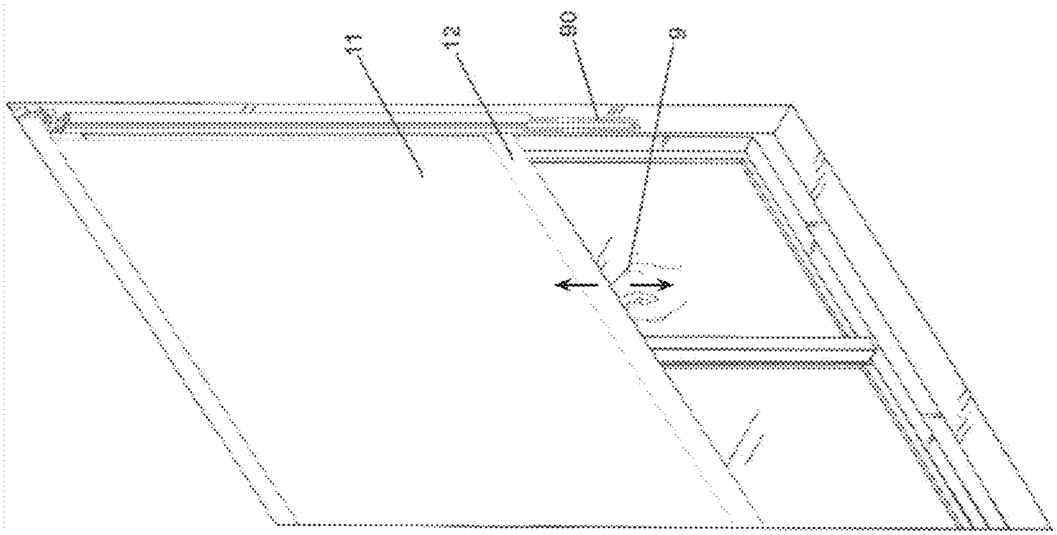
FIGS. 20-22 illustrate the using the bead controller to lift or lower the screen in the light-touch window covering system.

When the screen is at a position that is physically reachable by the user, the user may raise or lower the screen 11 by lightly maneuvering the bottom rail 12, as shown in FIG. 22. To lift the screen 11, the user may touch to lift the bottom rail 12 or lightly lift the screen 11 up at its side to counter act the weight of the bottom rail 12. This reduces the downward toque and the roller 1 is out of equilibrium. The tensile force on the screen 11 is used to release the lifting spring 4 so the torque of the spring is used to rotate the rotation synchronizer 5, cause the roller 1 to rotate and allowing the screen 11 and the bottom rail to be lifted by the user's touch. When the screen 11 and the bottom rail 12 are lifted beyond the reach of the user's hand, the user may use the bead controller 90 to lift the screen 11 to the highest possible position to complete the retraction of the screen 11.

Figure 23:
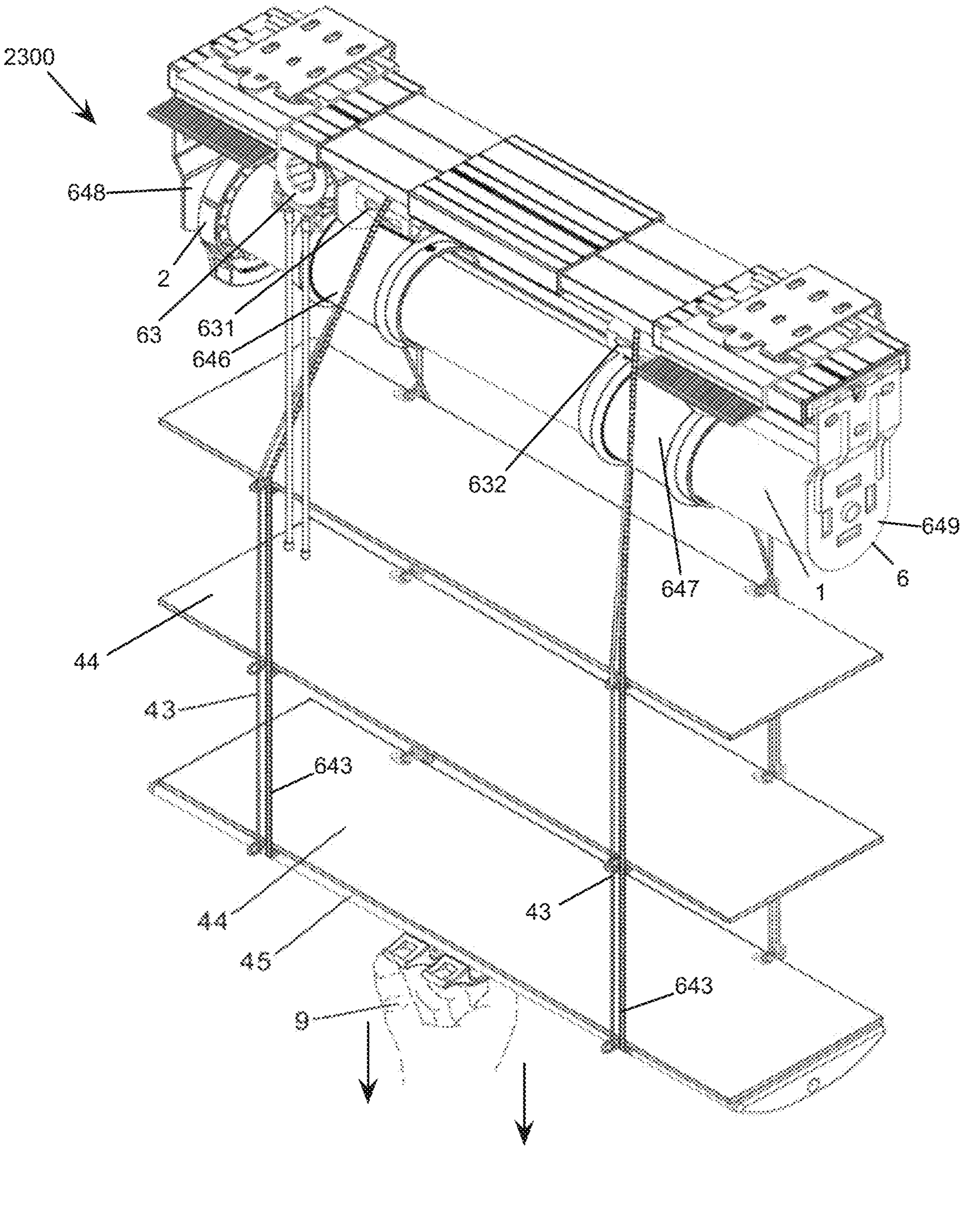
FIGS. 23-25 show a horizontal roller blind that incorporates the light-touch window covering system for releasing or retracting vanes of the blind.
Figure 24:
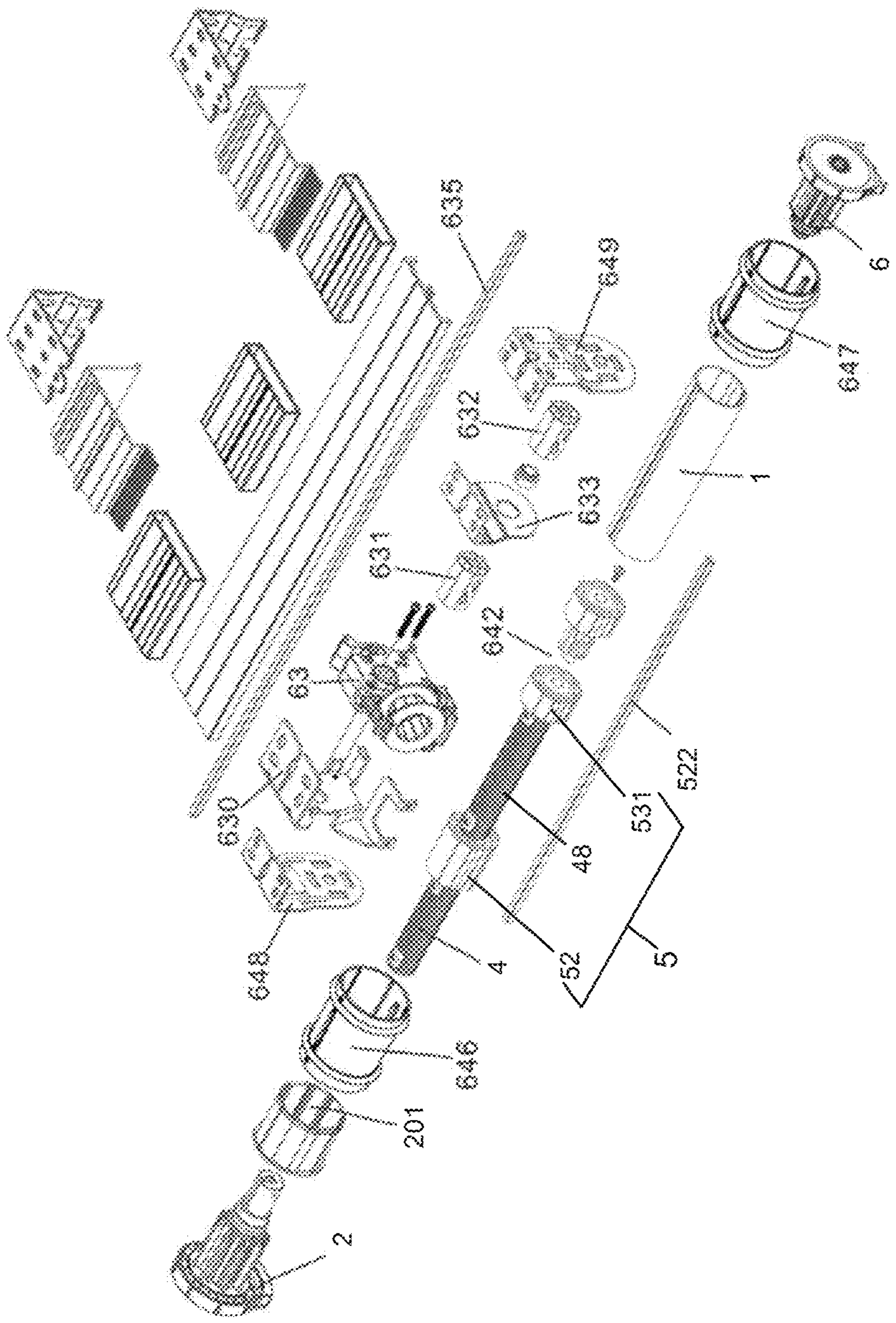

As mentioned, the light-touch window covering system can be implemented in a horizontal roller blind, which has vanes instead of a screen for blocking sunlight. FIGS. 23-24 show a horizontal roller blind 2300 that incorporates the light-touch window covering system for releasing or retracting vanes of the blind. As illustrated, the horizontal roller blind 2300 has an array of vanes 44 and a bottom rail 45. In some embodiments, the bottom rail 45 weighs more than the horizontal vanes 44, or more than at least half of the horizontal vanes 44. A pair of hexagonal shaped tilting rollers 631 and 632 have the tilting belts 643 wrapped around them for tilting the vanes 44 and the bottom rail 45. The tilting rollers are affixed to a tilting rod 635, whose rotation is driven by a tilting controller 63.

The horizontal roller blind 2300 also includes the roller 1 assembly described above. The roller 1 assembly includes the rotation balancer 2, the lifting springs 4 and 48, the rotation synchronizer 5 (implemented by hybrid connectors 52 and 531), the rotation damper 6, and other components that are installed along the core rod 522. For the horizontal roller blind 2300, a pair of bobbins 646 and 647 are installed on the roller 1 tubing. The bobbins 646 and 647 have lifting belts 43 wrapped around them for retracting or releasing the vanes 44 and the bottom rail 45.

The lifting springs 4 and 48 are pre-torqued to match the weight of the vanes 44 and the bottom rail 45 to achieve torque equilibrium at the roller 1 so that the user may lower or raise the blind vanes to any vertical position by lightly touching the bottom rail 45. The rotation damper 6 provides dynamic friction to dampen the up and down motion and static friction to help hold the equilibrium. The user may adjust the upward torque by using the rotation balancer 2 to adjust the torque energy stored in the lifting springs 4 and 48.

Figure 25:
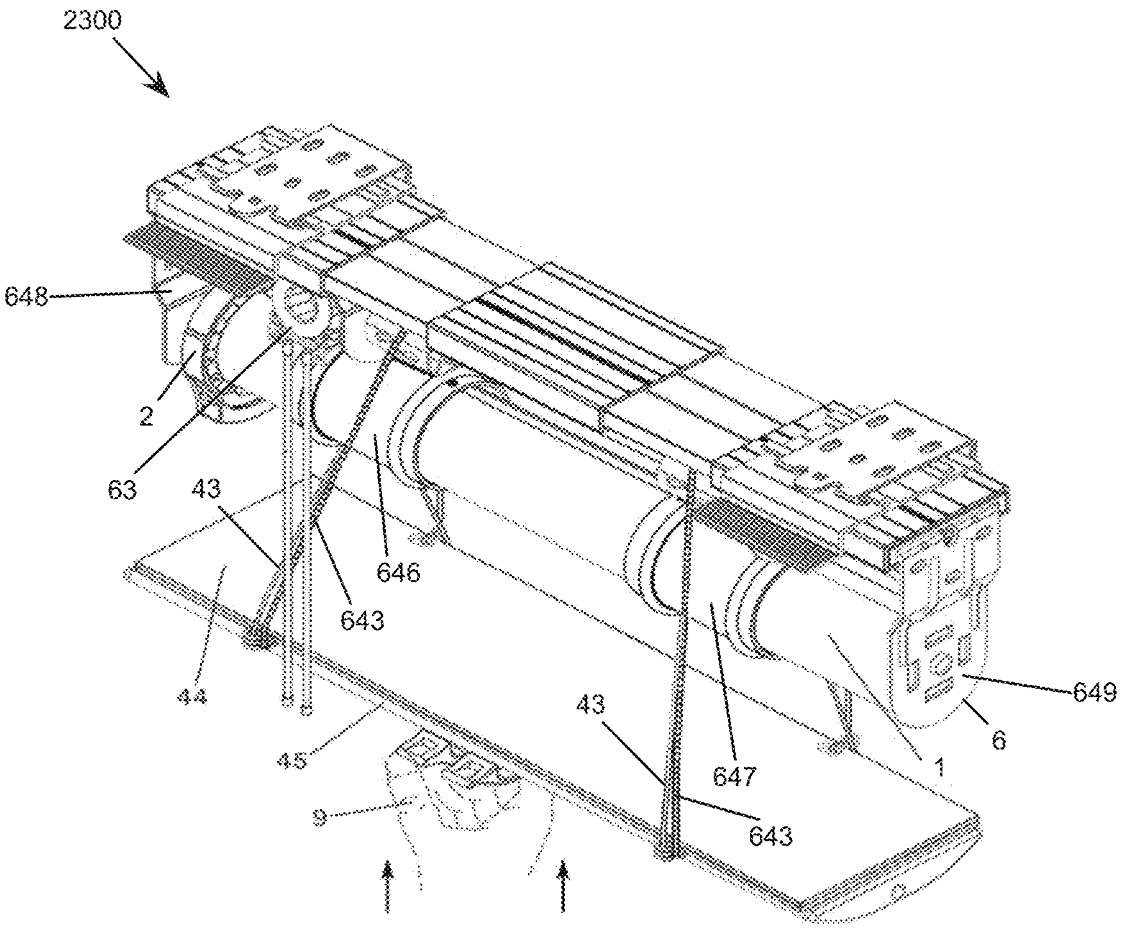

This forms a light-touch window covering system for a horizontal roller blind, allowing control of release and retraction of roller blind vanes by light user touches. FIG. 23 illustrates the user 9 lowering the blind vanes 44 by lightly pulling down the bottom rail 45. FIG. 25 illustrates the user 9 raising the blind vanes 44 by lightly pushing up the bottom rail 45.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An apparatus comprising:
- a screen of a roller shade;
- a roller tubing that rotates to release or retract the screen;
- a bottom rail attached to a bottom of the screen;
- a lifting spring that is pre-torqued for rotating the roller tubing to lift the screen; and
- a rotation damper providing a friction to dampen or stop a rotation of the roller tubing,
- wherein a downward torque provided by the bottom rail and an upward torque provided by the lifting spring are in an equilibrium of holding the screen when the screen is in a position selected by a user,
- wherein a static friction of the rotation damper is used to reach and hold the equilibrium and a dynamic friction of the rotation damper is used to dampen the motion of the screen and the roller tubing.

2. The apparatus of claim 1, wherein the lifting spring is pre-torqued by an amount based on a weight of the bottom rail.

3. The apparatus of claim 1, wherein the bottom rail weighs more than the screen.

4. The apparatus of claim 1, wherein the bottom rail weighs more than half of the screen.

5. The apparatus of claim 1, wherein the lifting spring is pre-torqued to have sufficient torque and energy to retract the screen in entirety.

6. The apparatus of claim 1, wherein the rotation damper comprises a frictional surface that is configured based on (i) an expected difference between the downward torque and the upward torque during the equilibrium, and (ii) an expected torque change at the roller tubing due to a user contact of the screen.

7. The apparatus of claim 6, wherein the frictional surface provides a static friction that is greater than the expected difference between the downward torque and the upward torque during the equilibrium and less than the expected torque change at the roller tubing due to the user contact of the screen.

8. The apparatus of claim 1, further comprising a core rod in the roller tubing that does not rotate with the roller tubing, wherein a first end of the lifting spring is rotationally coupled to the core rod and a second end of the lifting spring is fastened to a rotation connector that is rotationally coupled with the roller tubing.

9. The apparatus of claim 8, further comprising a rotation balancer comprising a balancer body that is rotationally coupled to the core rod and a balancer rotator that is rotationally coupled to the roller tubing.

10. The apparatus of claim 9, wherein rotating the balancer body adjusts an amount of torque generated by the lifting spring.

11. The apparatus of claim 9, wherein the rotation balancer comprises a bead wheel for receiving a bead chain for rotating the roller tubing.

12. The apparatus of claim 1, wherein the rotation damper comprises a bead wheel for receiving a bead chain for rotating the roller tubing.

13. The apparatus of claim 1, wherein the rotation damper comprises a damper spring for providing an additional upward torque or downward torque whenever the user touches the screen or the bottom rail.

14. An apparatus comprising:
- a plurality of horizontal vanes of a roller blind;
- a roller tubing that rotates to release or retract the horizontal vanes;
- a bottom rail attached to a bottom of the horizontal vanes;
- a lifting spring that is pre-torqued for rotating the roller tubing to lift the horizontal vanes; and
- a rotation damper providing a friction to dampen or stop a rotation of the roller tubing,
- wherein a downward torque provided by the bottom rail and an upward torque provided by the lifting spring are in an equilibrium of holding the screen when the screen is in a position selected by a user,
- wherein a static friction of the rotation damper is used to reach and hold the equilibrium and a dynamic friction of the rotation damper is used to dampen the motion of the screen and the roller tubing.

15. The apparatus of claim 14, wherein the bottom rail weighs more than the plurality of horizontal vanes.

16. The apparatus of claim 14, wherein the bottom rail weighs more than half of the plurality of horizontal vanes.

17. The apparatus of claim 14, wherein the lifting spring is pre-torqued to have sufficient torque and energy to retract the plurality of the horizontal vanes and the bottom rail.

* * * * *